United States Patent [19]

Baecklund

[11] 4,382,185

[45] May 3, 1983

[54] PROPORTIONAL DETECTOR

[76] Inventor: Johannes Baecklund, S-572 00 Oskarshamn, Sunnevik, Sweden

[21] Appl. No.: 196,584

[22] Filed: Oct. 14, 1980

[30] Foreign Application Priority Data

Oct. 16, 1979 [SE] Sweden ............................... 7908566

[51] Int. Cl.[3] ............................................. G01T 1/18

[52] U.S. Cl. ................................................ 250/385

[58] Field of Search .................... 250/374, 385; 313/93

[56] References Cited

U.S. PATENT DOCUMENTS 3,013,156 12/1961 Hearn .................................... 313/93

3,230,372 1/1966 Spracklen ............................ 250/385

3,359,443 12/1967 Givens ................................. 250/385

*Primary Examiner*—Alfred E. Smith

*Assistant Examiner*—Janice A. Howell

*Attorney, Agent, or Firm*—Larson and Taylor

[57] ABSTRACT

There is provided a proportional detector which is intended for use together with an X-ray tube in fluorescence measuring apparatus. The detector comprises a circular-cylindrical body which is divided into a plurality of identical sectors forming the chamber (3) of said detector and which has a circular-cylindrical recess (1) for accommodating an X-ray tube (2).

The inner surfaces of the chambers (3) comprise a metal or a metal coating (4) and are electrically conductive. Extending axially within the chambers (3) is a thin wire (5) which forms the positive electrode of the detector. The inner surfaces of the chambers form the negative electrode of the detector. The detector is intended to be placed on the sample to be examined.

7 Claims, 2 Drawing Figures

PROPORTIONAL DETECTOR

Figure 1:
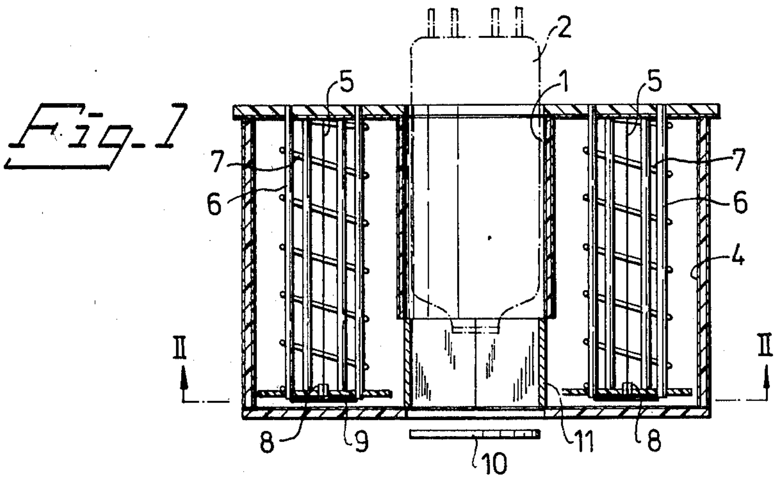

The present invention relates to a proportional detector for capturing and measuring ionizing radiation within wide solid angles. The detector includes at least one chamber having a central electrode in the form of a thin wire, which forms the positive electrode of the detector, while the inside of the chamber forms the negative electrode of the detector. The detector according to the invention can be used, for example, in determining the amount of a crystalline substance in a sample.

Different kinds of detectors for this purpose are known to the art. With one such detector, the semiconductor crystal, the geometric extent thereof is restricted to dimensions below 1 $cm^2$, for manufacturing reasons. With another of said detectors, the scintillation detector, the size and shape of the photo-cathode which receives light from the crystal limit the dimensions of the detector. These detectors also have other disadvantages when used in apparatus for measuring the content of basic elements or crystalline substances in samples.

The detector described in the introduction, which is often the most suitable for use when taking measurements of the aforementioned kind, i.e. the proportional detector, comprises a cylindrical chamber having a central, thin wire extending along the cylinder axis. The chamber is filled with a gas which exhibits suitable ionization properties, so that incident radiation is absorbed and positive ions and free electrons are formed in an amount which is proportional to the energy of the incident radiation. The electrons are drawn by an electronic field, towards the central wire in the detector and, if the field in the proximity of the wire is of suitable strength, become multiplied by repeated collision with the atoms of the gas present in said member. The charge thus created acts on an amplifier connected to the wire, said amplifier registering in this way each individual X-ray quantum absorbed and its energy.

One disadvantage with known proportional detectors is that in order for the detector to function satisfactorily the field must be distributed evenly along the wire, and the detector today has the form of a cylindrical tube made of metal or metal-coated glass and having a window through which the ionizing radiation falls onto the gas. The cylindrical tube normally has a diameter of about 2 cm, although diameters of up to about 5 cm are known.

When wishing to determine how much of a given basic element is present in a sample, the sample is coupled to an X-ray source, so as to satisfactorily irradiate the sample and so that fluorescent radiation can reach the detector. If the detector were able to capture all fluorescent radiation from the sample, the measuring device of conventional proportional detectors would obtain a much higher degree of sensitivity. An object of the invention is therefore to provide a porportional detector which is able to capture the radiation reflected by the sample, in practically all directions in space without disturbing the electrostatic field in the detector.

This object is realized by means of the proportional detector according to the invention, which is intended for use together with an X-ray tube in fluorescence measuring apparatus and which is intended to be placed on the object to be examined. The detector according to the invention has the form of a body which is constructed symmetrically about a central recess which is intended to accommodate the X-ray tube and the axis of which coincides with the axis of said tube in a manner such that said chamber or chambers surround the X-ray tube.

Figure 2:
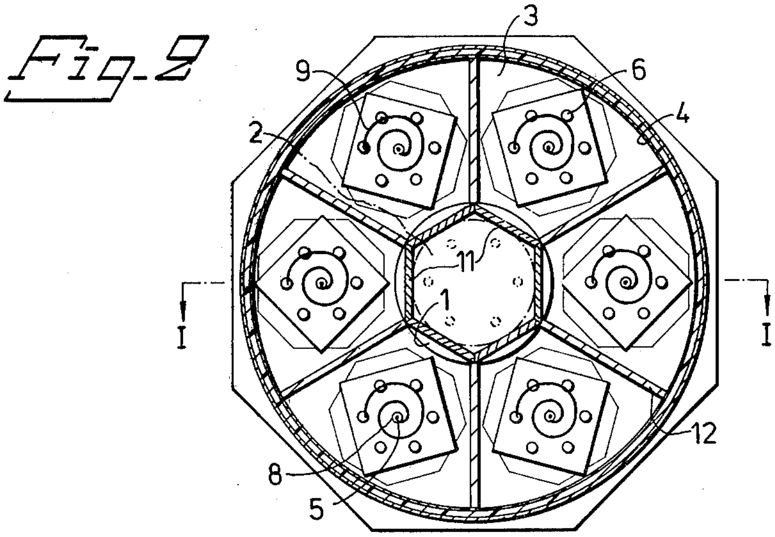

An exemplary embodiment of the invention will now be described in more detail with reference to the accompanying schematic drawing, in which FIG. 1 is an axial sectional view taken on the line I—I in FIG. 2, and FIG. 2 is a cross-sectional view taken on the line II—II in FIG. 1.

The illustrated detector comprises a circular-cylindrical body having arranged therein a circular-cylindrical recess 1 in which an X-ray tube 2, shown in dash lines, can be accommodated. The detector is divided by walls 12 into a plurality of identical sectors 3, which form the chamber of the detector. The wall of the recess 1 forms a shield, which prevents X-ray radiation from spreading directly from the X-ray tube directly into the sectors or chambers 3. The outer surfaces of the circular cylinder and its recess 1 comprise aluminum, while its inner surfaces comprise a plastics material coated with metal, as indicated by the reference 4. The top and bottom comprise a plastics material with a metal coating 4. The walls 12 are made of phosphor-bronze which, similar to the metal coatings 4, is electrically conductive. Extending axially through each sector 3, centrally thereof, is a thin wire 5 which forms the positive electrode of the detector. Each wire is surrounded by a separate grid structure, comprising a plurality of rods 6, and a helix 7 extending around the rods. The grid structures have a negative potential against the wire 5, and a positive potential against the chamber wall 4. In the FIG. 1 embodiment, the lower end of each wire 5 is enclosed in a field-adjusting tube 8. Further, each of said grid structures includes in its lower part a field-adjusting resistance helix 9. The sample to be examined and irradiated by X-ray radiation is placed in the geometric extension of the X-ray tube 2, as shown at 10 in FIG. 1. The lower part of the circular-cylindrical recess 1 has arranged therein a beryllium window, there being one such window for each sector 3.

The sectors 3 are each filled with a gas having suitable ionization properties so that incident radiation is absorbed and positive ions and free electrons are formed when fluorescent radiation, generated by X-ray radiation, from the sample 10 enters the sectors 3 through the windows 11. There is applied to the inner surfaces of the sectors, i.e. the metal coatings and the phosphor-bronze, a potential which is lower than the potential of the grid structures 6, 7 and which reaches for example to 200 volts, while the wire 5 is given a potential which is higher than the potential of the grid structures and which reaches, for example, to 1,500 volts. Those electrons which are excited by the incident fluorescent radiation will be drawn towards the grid structures, whereat, because the grid structures exhibit wide gaps, only a small percentage of said electrons will be captured by said grids, while the majority of the electrons will pass through the grids and be multiplied when they are accelerated towards the wires 5.

Thus, the detector according to the invention enables the construction of fluorescence measuring apparatus which are capable of utilizing emitted fluorescent radiation to a far greater extent than was previously possible, without losing the advantages of being able to register both radiation quantum and its energy, these advantages being essential to many measuring instruments.

What I claim is:

1. A proportional detector for fluorescence measuring of an object comprising chamber means defined by at least one chamber and having a central electrode in the form of a thin wire which forms the positive electrode of the detector, the inner surfaces of said chamber means forming the negative electrode of said detector, the chamber means being formed symmetrically about a central recess, which recess is constructed to accomodate an x-ray tube with the axis of said recess coinciding with the axis of the x-ray tube in a manner such that the chamber means surrounds the x-ray tube.

2. A detector according to claim 1, characterized in that said chamber means is divided by walls (12) into a plurality of identical part-chambers (3) having electrically conductive inner surfaces which form the negative electrode of the detector, whereat the wire-shaped central electrodes of respective part-chambers constitute generatrices in the same circular cylinder.

3. A detector according to claim 2, characterized in that arranged within each part-chamber (3) and around respective central electrodes 5 is a grid structure (6,7), said grid structure having a potential which lies between the potentials of the positive and negative electrodes and having the purpose of smoothing out the uneven field in the geometrically irregularly formed part-chambers (3).

4. A detector according to claim 3, characterized in that the grid structures comprise rod-like elements (6) and a helix (7) which extends around said elements and binds them together.

5. A detector according to any one of claims 1–4, characterized in that the positive and the negative electrodes are connected together at at least one of their attachment points by means of at least one field adjusting element (8,9).

6. A detector according to claim 5, characterized in that the field adjusting element comprises a resistance helix (9).

7. A detector according to any one of claims 1–4, characterized in that it has the form of a circular-cylindrical body with an axial, circular-cylindrical recess (1) for accommodating a X-ray tube (2).

* * * * *